(12) United States Patent
Horesh et al.

(10) Patent No.: US 11,561,963 B1
(45) Date of Patent: Jan. 24, 2023

(54) METHOD AND SYSTEM FOR USING TIME-LOCATION TRANSACTION SIGNATURES TO ENRICH USER PROFILES

(71) Applicant: Intuit Inc., Mountain View, CA (US)

(72) Inventors: Yair Horesh, Kfar-Saba (IL); Yehezkel S. Resheff, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/286,242

(22) Filed: Feb. 26, 2019

(51) Int. Cl.
*G06F 7/00* (2006.01)
*G06F 17/00* (2019.01)
*G06F 16/23* (2019.01)
*G06F 16/22* (2019.01)
*G06F 16/2458* (2019.01)

(52) U.S. Cl.
CPC ...... *G06F 16/2379* (2019.01); *G06F 16/2282* (2019.01); *G06F 16/2477* (2019.01)

(58) Field of Classification Search
None
See application file for complete search history.

(56) References Cited

U.S. PATENT DOCUMENTS

| | | | |
|---|---|---|---|
| 8,600,835 B1 * | 12/2013 | Lueck | G06Q 30/0283 705/26.1 |
| 8,736,612 B1 | 5/2014 | Goldman et al. | |
| 8,860,587 B2 | 10/2014 | Nordstrom | |
| 9,596,207 B1 | 3/2017 | Lin et al. | |
| 10,217,130 B1 * | 2/2019 | Varma | G06Q 30/0259 |
| 10,467,706 B2 | 11/2019 | Lacoss-Arnold et al. | |
| 2008/0201269 A1 | 8/2008 | Hollins et al. | |
| 2009/0320047 A1 | 12/2009 | Khan et al. | |
| 2010/0014443 A1 | 1/2010 | Cristian et al. | |
| 2010/0161379 A1 | 6/2010 | Del Bene et al. | |
| 2011/0246306 A1 | 10/2011 | Blackhurst et al. | |
| 2012/0016817 A1 | 1/2012 | Smith et al. | |
| 2013/0030955 A1 * | 1/2013 | David | G06Q 30/06 705/26.8 |
| 2014/0096249 A1 | 4/2014 | Dupont et al. | |
| 2014/0235270 A1 | 8/2014 | Zhang et al. | |
| 2016/0253710 A1 | 9/2016 | Publicover et al. | |
| 2016/0314528 A1 | 10/2016 | Abbott et al. | |

(Continued)

FOREIGN PATENT DOCUMENTS

| | | |
|---|---|---|
| JP | 2015125531 A | 7/2015 |
| KR | 101366369 B1 | 2/2014 |

OTHER PUBLICATIONS

Resheff et al., "Detecting Life Events by Applying Anomaly Detection Methods to Transaction Data," U.S. Appl. No. 16/521,814, filed Jul. 25, 2019.

(Continued)

*Primary Examiner* — Tuan A Pham
(74) *Attorney, Agent, or Firm* — Paradice and Li LLP

(57) ABSTRACT

A method and system identify characteristics of transaction description strings. The method and system extracts time data and location data from transaction description strings. The method and system generate estimated time data and location data for transaction strings that lack time data and location data by analyzing the time data and location data extracted from other transaction description strings. The method and system generate a user profile based on the estimated time data and estimated location data.

23 Claims, 6 Drawing Sheets

(56) References Cited

U.S. PATENT DOCUMENTS

| | | | |
|---|---|---|---|
| 2016/0343100 A1* | 11/2016 | Davenport | G06Q 50/265 |
| 2017/0076378 A1 | 3/2017 | Dintenfass et al. | |
| 2017/0206593 A1 | 7/2017 | Zolotov | |
| 2018/0232666 A1* | 8/2018 | Hokari | H04W 4/023 |
| 2018/0357674 A1 | 12/2018 | Hammad et al. | |
| 2019/0102681 A1 | 4/2019 | Roberts et al. | |
| 2019/0213609 A1 | 7/2019 | Jouhikainen et al. | |
| 2019/0295087 A1 | 9/2019 | Jia et al. | |
| 2020/0383081 A1 | 12/2020 | Edwards et al. | |

OTHER PUBLICATIONS

Resheff et al., "Method and System for Identifying, Tracking, and Predicting the Location of Moving Merchants," U.S. Appl. No. 16/524,521, filed Jul. 29, 2019.

International Search Report and Written Opinion, dated Apr. 23, 2020, PCT/US2019/044315, filed Jul. 31, 2019.

International Search Report and Written Opinion, dated Jul. 3, 2020, PCT/US2019/044468, filed Jul. 31, 2019.

Murray, "Site Planning and Revenue Prediction: Optimizing Food Truck Locations in New York City," CARTO Blog, retrived on Nov. 12, 2021 at https://carto.com/blog/optimizing-food-truck-locations/ (Year: 2018).

Abe et al., "Predicting the Occurrence of Life Events from User's Tweet History," IEEE Xplore, 2018 12th IEEE International Conference on Semantic Computing, pp. 219-226, Apr. 12, 2018.

Cavalin et al., "A Multiple Classifier System for Classifying Life Events on Social Media," 2015 IEEE 15th International Conference on Data Mining Workshops, pp. 1332-1335, Nov. 1, 2015.

\* cited by examiner

200

119 

- -FRYS FOOD & DR 02/05 #000513671 PURCHASE 2626 83RD AVE. PHOENIX AZ
- -FRESHBOOKS 416-4816946 DEegz4qqs6 4164816946 320180370915794719
- -PNC PYMT PNC MORTGAGEPPD
- -PARKSIDE PED FIVE FORK SIMPSONVILLE SC C_OTHEREXPENSES
- -OPC BOSTON PARK 02/04/18 13:43:32
- -LCA*LABCORP (LCBS) WEB
- -SQU*SQ *EDDY M'S CAFE LA JOLLA CA - Date 02/05/18 0 8036294600 0 5812- Card Withdrawal Debit Card
- -MORGAN HILL STORAGE
- -POS DEBIT 1834 02/06 9:56 MCDONALD S 706300
- -Tokyo Sushi & Catering
- -Acorns Investing DES:Transfer ID:Z3ZT54
- -CHECKCARD 0204 HOTEL NIKKO SAN FRANCIS SAN FRANCISCOCA 24055238036207088600886
- -TW04B303 73 14 37TH AVENUETW04B303 73 14 37TH AVENUE JACKSON HTS * NY
- -TRIAD KIDS CAMPU 5159630215 IATRIAD KIDS CAMPU 5159630215 IA 084629
- -LYFT *RIDE MON 4PMSAN FRANCISCOOPSNT_CGSH9(NONE) 94104 320180370917245969
- Withdrawal -ACH EMIGRANT BANK TYPE: TRANSFER CO: EMIGRANT BANK COMCAST CABLE COMMUNICATIONS Bill Payment
- -FANDANGO.COM
- -SUNOCO 0368297801 HAMILTON TWP NJ
- -GEMINI TRUST CO ACH TXFER c726201 WEB ID: 1475153145 BETTERMENT SEC TRANSFER A13252676 WEB ID: 1743132639

FIG. 2

METHOD AND SYSTEM FOR USING TIME-LOCATION TRANSACTION SIGNATURES TO ENRICH USER PROFILES

BACKGROUND

Every year millions of people around the world use electronic data management systems to help manage their personal data. For example, many people utilize data management systems to help manage their finances. Such data management systems gather data related to transactions of their users. The users can monitor many, even all, of their transactions and other matters from a single data management system. Data management systems can help users save time by eliminating the need for users to check several different accounts in order to manage their data.

Automated download of transaction data from, as an example, financial institutions can be a highly valued feature of data management systems such as bookkeeping systems, tax return preparation systems, and personal financial tracking systems. Downloaded transactions can help users reconcile their income and expenses and create business reports in bookkeeping systems, help locate donations and other deductions in tax return preparation systems, and help users monitor their spending and budgets in personal data tracking systems.

Additionally, data management systems can generate profiles for their users in order to provide more personalized data management services based on the data that is known about the users, making for more focused and customized user experiences. However, it is currently often difficult to obtain relevant user profile data. Transactions represent one possible source of data from which user profiles can be generated. Each transaction includes a transaction description string that typically identifies some characteristics of the transactions. As a specific illustrative example, transaction strings can typically include a date and a price. In addition, some transaction description strings include some information associated with the parties involved, such as a type of merchant, a name of a merchant, or a store number. A small portion of the transaction description strings include a time of day for the transaction or enough detail about the parties to determine the geolocation associated with the transaction.

However, because the large majority of transactions do not include a time of day or a geolocation associated with the transaction, traditional data management systems are unable to generate user profiles that take into account the times of day and the geolocations of the large majority of transactions. Accordingly, traditional data management systems are unable to more fully personalize data management services for users. The result is that some users of the traditional data management systems may feel that the traditional data management systems do not meet their personal needs. These users may become frustrated and may abandon the traditional data management systems.

What is needed is a method and system that solves the long-standing technical problem of data management systems that are unable to identify many relevant details associated with transactions when transaction description strings do not explicitly include these details.

SUMMARY

Embodiments of the present disclosure provide one or more technical solutions to the technical problem of electronic data management systems that are unable to identify many relevant details associated with transactions when transaction description strings do not explicitly include these details. Embodiments of the present disclosure gather transaction data including transaction description strings for users. Some of these transaction description strings include a time of day or enough detail to identify a location of the transaction. Embodiments of the present disclosure extract the times of day and locations from these transaction description strings. Many other description strings do not include a time of day or location. Embodiments of the present disclosure execute one or more time-location algorithms to generate estimated times of day and estimated geolocations for these transactions based on the known times of day and known geolocations of other transactions. Embodiments of the present disclosure utilize this enriched knowledge of the user to generate a profile for the user in order to more fully personalize data management services for the user.

Embodiments of the present disclosure address some of the shortcomings associated with traditional data management systems. Time-location algorithms are used to estimate additional unknown data related to the transactions. The various embodiments of the disclosure can be implemented to improve the technical fields of data management, data processing, and data transmission. Therefore, the various described embodiments of the disclosure and their associated benefits amount to significantly more than an abstract idea.

BRIEF DESCRIPTION OF THE DRAWINGS

FIG. 2 is a representation of transaction description strings retrieved by a data management system, in accordance with one embodiment.

Figure 1:
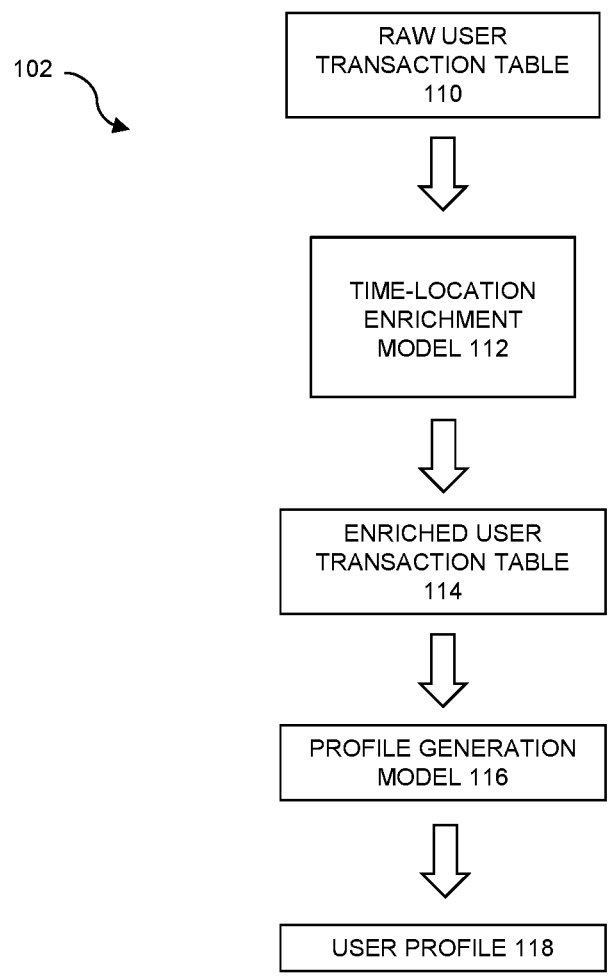
FIG. 1 is a block diagram of a system for predicting characteristics of transactions of users of a data management system, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments.

Embodiments may be implemented in many different forms and should not be construed as limited to the embodiments set forth herein, shown in the FIGs, and/or described below. Rather, these exemplary embodiments are provided to allow a complete disclosure that conveys the principles of the invention, as set forth in the claims, to those of skill in the art.

FIG. 1 illustrates a block diagram of a production environment 100 for predicting characteristics of transactions of users of a data management system, according to one embodiment. Embodiments of the present disclosure retrieve data related to transactions of a user. The data includes a transaction description string for each transaction. Some transaction description strings may include data identifying one or both of a time of day and a location associated with those transactions. Many transaction description strings include neither a time of day nor a location. Embodiments of the present disclosure use analytic techniques to estimate a time of day and a location for those description strings that lack this information based on the transaction description strings that do include this information. Embodiments of the present disclosure utilize these estimated time and location characteristics to develop a more complete profile of the user. Embodiments of the present disclosure then provide personalized data management services to the user based on the profile.

The disclosed methods and systems for predicting characteristics of transactions of users of a data management system provides for significant improvements to the technical fields of electronic transaction data processing, data processing, data management, and user experience. The disclosed methods and systems for predicting characteristics of transactions of users of a data management system provide for the processing and storage of smaller amounts of data, i.e., more efficiently provide data management services; thereby eliminating unnecessary data analysis and storage. Consequently, using the disclosed methods and systems for predicting characteristics of transactions of users of a data management system results in more efficient use of human and non-human resources. For example, based on the profile of the user, the data management system can predict the most useful and relevant data management services for the user. This reduces the amount of searching and wandering by the user through the many possible services provided by the data management system. In turn, this results in fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for predicting characteristics of transactions of users of a data management system.

In one embodiment, a data management system 102 is implemented in the production environment 100. The data management system 102 assists users to manage their finances and other data. As one specific example, users can enable the data management system 102 to access their accounts with institutions such as banks and credit card companies. In this illustrative example, the data management system 102 periodically accesses accounts of the users in order to retrieve data related to the transactions of the users. The data management system 102 typically enables users to view all of their transaction data from a single location.

In one embodiment, the data management system 102 generates, for each user, a raw user transaction table 110. The raw user transaction table 110 lists all of the transactions of the user grouped by the dates of the transactions. The raw user transaction table 110 includes, for each transaction, the transaction description string.

In one embodiment, the raw user transaction table 110 includes, for each transaction, a data field for the time of day when the transaction took place, and a location associated with the transaction. The data management system 102 populates the time of day and location fields with data extracted from the transaction description strings. If the transaction description string for a transaction does not include the time of day or a location, then the corresponding data fields are left blank or otherwise made to indicate a lack of information.

Most transaction description strings do not include a time of day. Many transaction description strings do not include data identifying the location associated with the transaction. Some transaction description strings include one or both of a time of day and the location. The data management system 102 extracts the time of day and location and populates corresponding fields in the raw user transaction table 110.

In one embodiment, even when a transaction description string includes some data related to the location of the transaction, this data is not enough to exactly identify the location. For example, the location data may include a name of a business, a part of a name of a business, a store number, a ZIP Code, part of a street address, or other data that is related to the location, but by itself is not sufficient to determine the exact location associated with the transaction. The location fields in the raw user transaction table 110 can include any information that is related to the location associated with the transaction.

In some cases, the transaction description strings include an exact address or sufficient information to determine an exact address. The raw user transaction table 110 populates the location fields with this information. The raw user transaction table 110 may also include an indication that the location data is sufficient to determine the exact location associated with the transaction.

In one embodiment, most of the time of day and location data fields of the raw user transaction table are empty or otherwise indicative that the transaction description strings provide no data for these fields. These empty data fields represent an absence of knowledge that could otherwise be used to better understand the user and to thereby provide more effective data management services, and an improved user experience to the user. In order to remedy this absence of data, the data management system 102 includes a time-location enrichment model 112 to assist in identifying additional information about the transactions of the user.

In one embodiment, the data from the raw user transaction table 110 is passed to the time-location enrichment model 112. The time-location enrichment model 112 analyzes the data from the raw user transaction table 110 in order to generate estimated location and time of day data for the empty or insufficient data fields from the raw user transaction table 110. In particular, the time-location enrichment model 112 analyzes the times of day and locations for transactions that are known in the raw user transaction table 110 in order to generate estimates for the unknown times of day and locations from the raw user transaction table 110.

In one embodiment, the time-location enrichment model 112 implements one or more smart time-location resolving iterative algorithms to generate estimated times and locations for the unknown times and locations from the raw user transaction table 110. The time-location resolving iterative algorithms identify time and location constraints for the unknown transactions based on the known times and locations of other transactions. After the algorithms identify time and location constraints, the time-location algorithms iteratively narrow down probable time windows and locations until estimated times of day and locations are generated. The time-location resolving iterative algorithms can generate time estimations based on time-distance constraints. The time-location resolving iterative algorithms can generate location estimations by adding time related constraints and performing an inverse optimization process to minimize travel required of the user.

In one embodiment, the time-location resolving iterative algorithm identifies time-distance constraints based on the known time and location data from the raw user transaction table. The time-location resolving iterative algorithm then generates estimated time ranges for the transactions based on the time-distance constraints. The time-location resolving iterative algorithm then identifies time constraints for estimating locations based on the estimated time ranges. The time-location resolving iterative algorithm then generates location estimates that comply with the time range constraints. The time-location resolving iterative algorithm then further refines the time estimates based on the location estimates. The time-location resolving iterative algorithm then further refines the location estimates based on the refined time estimates. This process continues iteratively until final time and location estimates are generated.

In one embodiment, the data management system 102 generates enriched user transaction table 114 based on the time-location enrichment model 112. The enriched user transaction table 114 includes the estimated times of day and estimated locations identified by the time-location enrichment model 112. Accordingly, the enriched user transaction table 114 populates data fields from the raw user transaction table 110 that were previously empty or that previously included insufficient location identification.

In one embodiment, once the data management system 102 has generated the enriched user transaction table 114, the data from the enriched user transaction table 114 is passed to a profile generation model 116. The profile generation model 116 analyzes the data from the enriched user transaction table 114. The profile generation model 116 identifies characteristics of the user based on the characteristics of the transactions as indicated in the enriched user transaction table 114. The profile generation model 116 identifies patterns within the enriched user transaction table 114. The profile generation model 116 classifies the user based on these patterns.

In one embodiment, the profile generation model 116 generates a user profile 118 based on the analysis of the data from the enriched user transaction table 114. The profile user can include attributes such as daily travel routes, method of commuting to work, daily purchasing habits, weekend travel and purchasing habits, the age range of the user, vacation days of the user, a number of shifts the user works, whether the user is a homeowner or a renter, a marital status of the user, whether the user has children, whether the user is a business owner, and many other details related to the user.

In one embodiment, the user profile 118 corresponds to a group or groupings of the user with other users of the data management system 102. The user can be grouped with other users of the data management system 102 based on similarities that the user has with other users of the data management system based on the characteristics of the transactions of the user.

In one embodiment, the data management system 102 can utilize the user profile and the inferred characteristics associated with the user profile in order to provide personalized data management services and user experiences by providing a more customized and relevant user experience to the user. The personalized data management services can include recommendations for pertinent products or services provided by the data management system 102, recommendations on ways that the user could save money, personalized promotional offerings from third parties based on the characteristics of the user, and many other personalizations that could benefit the user and that could increase the trust of the user in the data management system 102.

FIG. 2 is an illustration 200 of transaction description string data 119 including a list of transaction description strings retrieved by the data management system 102 for a user of the data management system 102. As can be seen from FIG. 2, the transaction description strings do not have a consistent format or contain the same kinds of information. Many transaction description strings include a name or portion of a name of a merchant involved in, for example, a financial transaction. Some transaction description strings include a part of an address such as a name of a city or a state. A few transaction description strings include a time of day or a substantially complete address.

Although not shown in FIG. 2, some transaction description strings typically include a purchase amount. Additionally, when the data management system 102 retrieves the transaction description strings, the data management system 102 also obtains the date on which the transactions occurred. Thus, many transactions, both the date and the transaction amount are known by the data management system 102. However, as set forth above, very few transaction description strings include a time of day for the transactions.

In one embodiment, the data management system 102 is able to recognize and extract relevant data structures from the transaction description strings. Names, addresses, and times may be included in the transaction description strings without a single consistent format. The data management system 102 is, nevertheless, able to analyze, recognize, and extract pertinent sub strings of alphanumeric characters from the transaction description strings.

Figure 3:
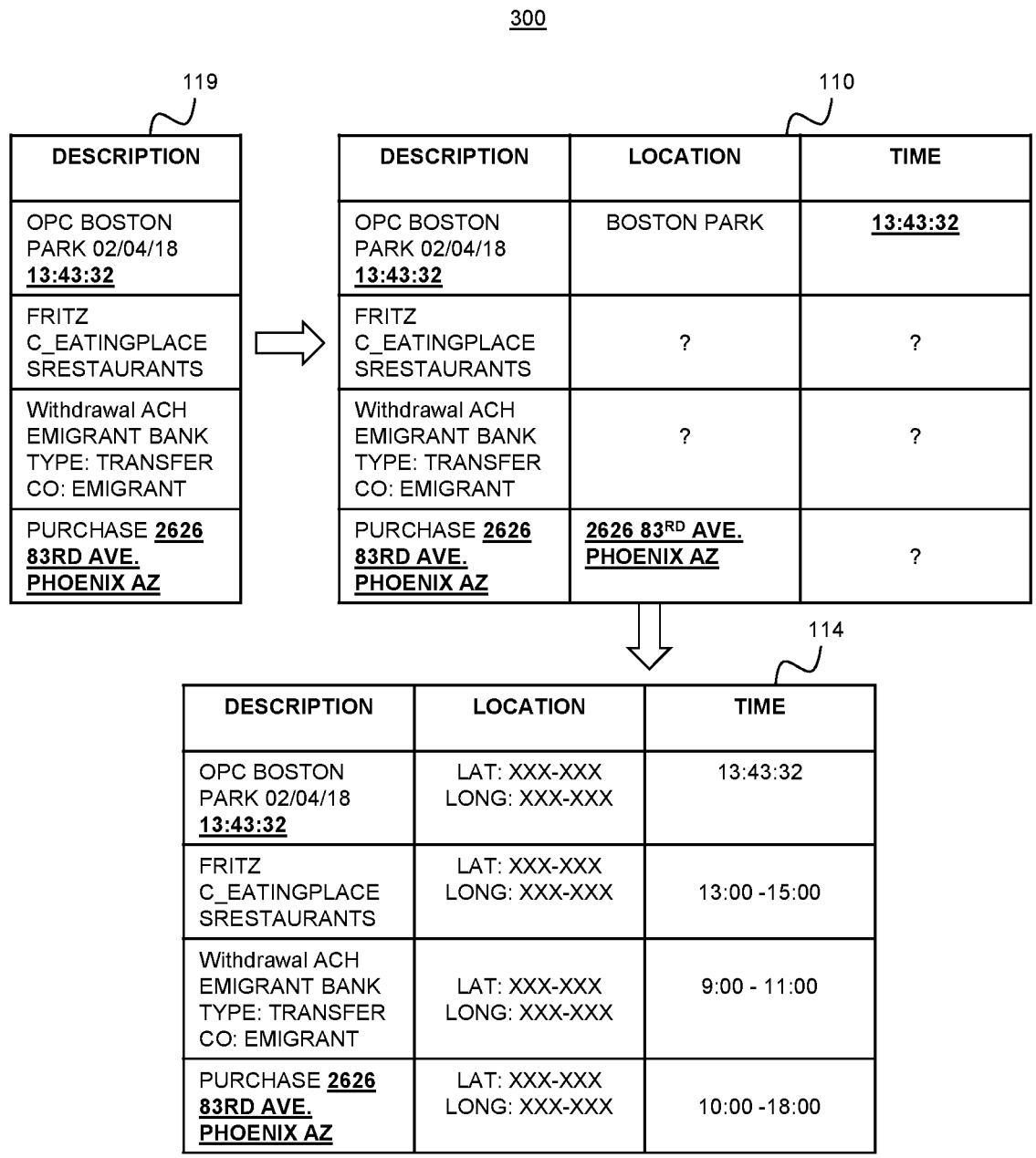
FIG. 3 is a simplified process 300 illustrating the transition from a set of transaction description strings to an enriched user transaction table, according to one embodiment.

FIG. 3 is a simplified process 300 illustrating the transition from a set of transaction description strings, such as included in the raw user transaction table 110 of FIG. 1 to an enriched user transaction table, such as enriched user transaction table 114 of FIG. 1, according to one embodiment. Returning to FIG. 3, the process 300 begins with transaction description string data 119 including a set of transaction description strings. For clarity, only four transaction description strings are shown in FIG. 3. Additionally, the transaction description strings themselves have been simplified for clarity in illustrating principles of the present disclosure, according to an embodiment. The list of transaction description strings corresponds to transactions that occurred on the same date.

In one embodiment, the data management system 102 analyzes the transaction description string data 119 and generates the raw user transaction table 110. In particular, the data management system 102 analyzes the transaction description strings and extracts data indicating a time of the day or a location associated with the transaction. The raw user transaction table 110 includes a column for location related data and time of day related data. When the data management system 102 extracts the location related data and the time related data, the data management system 102 populates the corresponding data fields of the raw user transaction table 110.

In the example of FIG. 3, the first transaction description string includes data indicating that the transaction took place at 13:43:32. The first transaction description string also includes data indicating a location of "Boston Park". The data management system 102 extracts this information and populates the corresponding location and time data fields for the first transaction description string.

In the example of FIG. 3, the second transaction description string does not indicate a particular location or time of day. The corresponding location and time data fields for the second transaction description string are left blank. In one embodiment, the partial name included in the transaction description string can be useful in identifying a location, as will be set forth in more detail below.

In the example of FIG. 3, the third transaction description string does not indicate a particular location or time of day. The corresponding location and time data fields for the third transaction description string are left blank. In one embodiment, the partial name included in the third transaction description string can be useful in identifying a location, as will be set forth in more detail below.

In the example of FIG. 3, the fourth transaction description string includes data indicating a location of 2626 83$^{rd}$ Ave, Phoenix Ariz. The fourth transaction description string does not include data indicating a time of day. The data management system 102 extracts this information and populates the corresponding location and time data fields for the first transaction description string.

In one embodiment, the process 300 analyzes the raw user transaction table 110 with the time-location enrichment model 112 and generates the enriched user transaction table 114. The enriched user transaction table 110 includes a location column and a time column. The time-location enrichment model 112 populates the time and location data fields for each transaction description. In one embodiment, the time-location enrichment model 112 analyzes the known times and locations and generates estimated times and locations for the transaction description strings that did not include a time or a location. Where an exact location was not previously known in the raw user transaction table 110, the enriched user transaction table 114 includes an estimated location. Where an exact time of day was not previously known in the raw user transaction table 110, the enriched user transaction table 114 includes an estimated time. The time-location enrichment model 112 utilizes one or more algorithms including time and distance constraints to generate the estimated locations and times.

In one embodiment, the enriched user transaction table 114 includes time ranges for estimated transaction times. The time ranges indicate a probable window of time in which the transaction could have occurred. Some estimated times have relatively small ranges, while others have large ranges. In general, the more confidently that the time-location enrichment model can estimate a time, the smaller the range.

In one embodiment, the enriched user transaction table 114 includes latitude and longitude coordinates for data fields in the location column. When a location can be confidently estimated, the latitude and longitude of that location is retrieved and used to populate the location field. Those of skill in the art will recognize, in light of the present disclosure, that location fields for an enriched user transaction table 114 can be populated with location data other than latitude and longitude.

Figure 4:
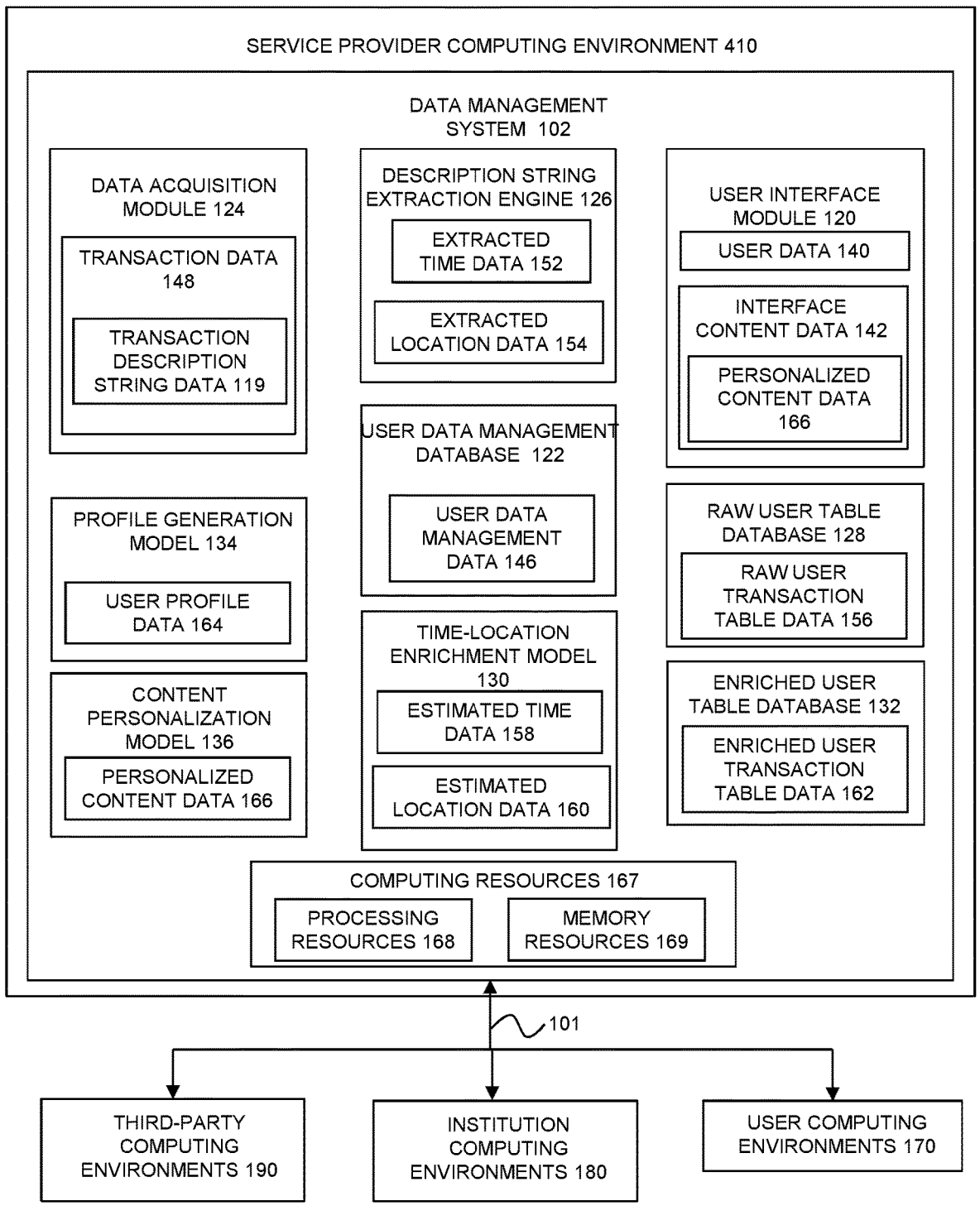
FIG. 4 is a block diagram of a system for predicting characteristics of transactions of users of a data management system, in accordance with one embodiment.

FIG. 4 is a block diagram of a production environment 400 for predicting characteristics of transactions of users of a data management system, according to one embodiment. For illustrative purposes, the specific example of FIG. 4 is directed to one embodiment wherein the transactions process are financial transactions.

The production environment 400 includes a service provider computing environment 410, user computing environments 170, institution computing environments 180, and third-party computing environments 190, for predicting characteristics of transactions of users of a data management system, according to various embodiments. The computing environments 410, 170, 180, and 190 are communicatively coupled to each other with one or more communication channels 101, according to one embodiment.

The service provider computing environment 410 represents one or more computing systems such as a server or distribution center that is configured to receive, execute, and host one or more data management systems (e.g., applications) for access by one or more users, for predicting characteristics of transactions of users of a data management system, according to one embodiment. The service provider computing environment 410 represents a traditional data center computing environment, a virtual asset computing environment (e.g., a cloud computing environment), or a hybrid between a traditional data center computing environment and a virtual asset computing environment, according to one embodiment.

The service provider computing environment 410 includes a data management system 102, which is configured to provide data management services to users of the data management system.

According to the specific illustrative example of FIG. 4, the data management system 102 can be a system that manages one or more of book-keeping, financial accounting, banking, investments, loans, credit cards, real estate investments, retirement planning, bill pay, and budgeting. The data management system 102 can be a tax return preparation system or other type of data management system. The data management system 102 can be a standalone system that provides data management services to users. Alternatively, the data management system 102 can be integrated into other software or service products provided by a service provider.

The data management system 102 receives transaction data related to transactions of users of the data management system 102. In one illustrative example, the data management system provides financial management services to the users based in part on the transaction data. For example, the data management system 102 can assist users in tracking expenditures and revenues by gathering the transaction data and organizing, for each user, the transaction data in a way that assists users to have an accurate view of their financial situations. The transaction data includes transaction description strings for each transaction. The data management system 102 identifies various details regarding transactions from the transaction description strings.

The data management system 102 includes a user interface module 120, a user data management database 122, a data acquisition module 124, a description string extraction engine 126, a raw user table database 128, a time-location enrichment model 130, an enriched user table database 132, a profile generation model 134, a content personalization model 136, and computing resources 167, according to various embodiments.

In one embodiment, the computing resources 167 include processing resources 168 and memory resources 169. The processing resources 168 include one or more processors. The memory resources 169 include one or more memories configured as computer readable media capable of storing software instructions and other data. The processing resources 168 are capable of executing software instructions stored on the computer readable media. In one embodiment, the various components, models, modules, databases, and engines of the data management system 102 utilize the computing resources 167 to assist in performing their various functions. Alternatively, or additionally, the various components, modules, databases, and engines can utilize other computing resources.

The user computing environments 170 correspond to computing environments of the various users of the data management system 102. The users of the data management system 102 utilize the user computing environments 170 to interact with the data management system 102. The users of the data management system 102 can use the user computing environments 170 to provide data to the data management system 102 and to receive data, including data management services, from the data management system 102.

In one embodiment, the data management system 102 can provide data management services to individuals, businesses, organizations, government entities, groups of individuals, or any other entities for which data management services would be beneficial, according to one embodiment. As one specific example, individuals may utilize the data management system 102 to track their own revenues and expenditures. Businesses of all kinds, including large corporations, midsize companies, small businesses, or even sole proprietor businesses, can utilize the data management system 102 to track and sort their transactions as a way to better manage their finances. Likewise, government organizations may use the data management system 102 to track various types of expenditures and revenues. Organizations other than businesses and government entities, such as nonprofit organizations, may also utilize the data management system 102 for the purpose of monitoring and sorting expenditures and revenues. Thus, the term "user" can refer to many types of entities.

Returning to the data management system 102, the user interface module 120 is configured to receive user data 140 from the users, according to one embodiment. The user data 140 includes information, such as, but not limited to, a name of the user, an address of the user, authentication data that enables the user to access the data management system, clickstream data corresponding to actions taken or commands entered by the user, or any other types of data that a user may provide while utilizing the services of the data management system 102.

In one embodiment, the user data 140 can include account data corresponding to authentication data that enables the data management system 102 to access the accounts that the user has with third-party institutions or other third-parties. In one embodiment, the authentication data provided by the users as part of the user data 140 enables the data management system 102 to acquire information related to transactions of the users. The authentication data can include data that allows the data management system 102 to gain access to credit card data, bank account data, retirement fund data, payroll data, income data, loan data, interest accrual data, student loan data, property ownership data, tax data, budgeting data, rent data, investments data, employment data, or other types of data regarding transactions or accounts of the users. Thus, the authentication data can include login credentials and personal identification data for various websites of third-party institutions. The authentication data can include usernames, passwords, bank account numbers, routing numbers, credit card numbers, answers to security questions, identification numbers, government identification numbers, birth dates, addresses, or other types of verification credentials that allow the data management system 102 to gain access to online services of third-party institutions.

According to an embodiment, the user interface module 120 provides interface content data 142 to assist the user in managing the user's finances. The interface content data 142 can include navigation menus and other graphical user interface (GUI) tools that enable the user to navigate the data management system 102 in order to receive data management services. The interface content data 142 can include data management data related to the transactions of the user. Thus, the user interface module 120 enables the data management system 102 to provide data management services to the user.

In one embodiment, the data management system 102 includes a user data management database 122. In one illustrative example, the user data management database 122 includes the user data management data 146. The user data management data 146 can include data management data for all of the users of the data management system. Thus, the user data management database 122 can include a vast amount of data related to the management services provided to users. In one embodiment, when the user utilizes the user interface module 120 to view interface content data 142, the interface content data 142 can include user data management data 146 related to the user as retrieved from the user data management database 122.

In one illustrative embodiment, the user data management data 146 includes data related to the transactions of the users. The user data management data 146 can include, for each user, a list of transactions, summaries of various accounts, and other tools to assist the user in managing the user's finances.

In one embodiment, each transaction in the user data management data 146 includes merchant identification data that identifies the merchant or vendor involved in the transactions. It can be particularly useful for the user to track transactions based on which merchants, vendors, or other types of counterparties were party to the transactions. This can help the user to more effectively manage the user's finances. Additionally, this can help the user to detect fraud or errors if the user notices, in the transactions of the user, unknown merchants with whom the user has not had any transactions.

In one embodiment, the data management system 102 utilizes the data acquisition module 124 to retrieve transaction data 148 related to the transactions of the users of the data management system 102. The data acquisition module 124 is configured to use the authentication data provided with the user data 140 to acquire transaction data 148 related to transactions of the users. In particular, the data acquisition module 124 uses the authentication data received with the user data 140 to log into the online services of third-party institutions in order to retrieve transaction data 148 related to the transactions of users of the data management system 102. For example, the transaction data 148 can include debit card transactions, credit card transactions, credit card balances, bank account deposits, bank account withdrawals, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, financial goal information, or any other types of transactions. The data acquisition module 124 is configured to gather the transaction data from financial institution computing environments 180 related to financial service institutions with which one or more users of the data management system 102 have a relationship. The transaction data 148 can include, for each transaction, time stamp data corresponding to a time stamp that indicates the date and time of the transaction.

In one example, the data acquisition module 124 uses the authentication data received with the user data 140 to acquire data related to withdrawals, deposits, and balances in the bank accounts of users. The transaction data 148 includes data related to these withdrawals, deposits, and balances. Accordingly, the authentication data can include usernames, passwords, bank account numbers, routing numbers, or other validation credentials needed to access online services of various banking institutions.

In one embodiment, the transaction data 148 includes transaction description string data 119. The transaction description string data 119 includes transaction description strings related to the transactions. Typically, when the data acquisition module 124 retrieves transaction data 148 related to a particular transaction, the transaction data will include a transaction description string based on the details associated with the transaction. These details can include the merchant counterparty, the date of the transaction, the price involved in the transaction, a geolocation associated with the transaction, a branch or store number associated with the transaction, an institution involved in the transaction, and the user involved in the transaction.

In many cases the transaction description strings are not in a form that enables quickly ascertaining the details of the transaction. Some aspects of the transaction may be apparent from the transaction description strings, such as the merchant involved, but other aspects may not be readily apparent from the transaction description strings.

In some cases, the transaction description strings include garbled or unintelligible strings of alphanumeric characters. The name of the merchant may be broken up among the strings of alphanumeric characters. A first portion of a name of the merchant may be separated from a second portion of the name of the merchant by several alphanumeric characters. In some cases, the name of the merchant itself is not readily identifiable to a human even when looking for portions of the merchant's name scattered throughout the alphanumeric string.

In one embodiment, the data management system 102 utilizes the description string extraction engine 126 to extract information directly from the transaction description string data 119 in order to generate a raw user transaction table for each user, as described above in relation to FIGS. 1-3. The description string extraction engine 126 analyzes each description string in order to extract information that is useful in understanding the characteristics of the transaction.

In one embodiment, each transaction description string typically includes a date and a purchase amount. As described above, a relatively small subset of transaction description strings include one or both of data indicating the time of day and a location for the transaction. The description string extraction engine 126 is configured to identify and extract data indicating a time of day or location from the transaction description strings.

In one embodiment, the description string extraction engine 126 uses a set of regular expressions, also known as regex, to extract time of day templates. Because the time of day can appear in many formats, the description string extraction engine 126 uses regular expressions that include various formats in which the times of day can appear.

In one embodiment, the description string extraction engine 126 uses a set of regular expressions to extract location templates. The location templates can include various address formats. The description string extraction engine 126 is also configured to identify place names and to extract them from the transaction description strings.

In one embodiment, the description string extraction engine 126 utilizes one or more machine learning models to generate extracted time data 152 and extracted location data 154. The description string extraction engine 126 utilizes a supervised machine learning process to train the one or more machine learning models. The supervised machine learning process utilizes a training set including a large number of transaction description strings including time and location data. The transaction description strings are also labeled with known times and locations. The machine learning process trains the model to accurately extract location and times that match the known labels.

In one embodiment, the description string extraction engine 126 generates extracted time data 152 corresponding to the time of day extracted from the various transaction description strings. The description string extraction engine 126 also generates extracted location data 154 corresponding to location data extracted from the transaction description strings. The data management system 102 utilizes the extracted time data 152 and the extracted location data 154 in order to populate the data fields in raw user transaction tables.

In one embodiment, the description string extraction engine 126 includes a recurrent neural network machine learning model. The recurrent neural network can include a plurality of nodes. Connections between the nodes form a directed graph along a sequence. The recurrent neural network can exhibit dynamic temporal behavior for a time sequence. The recurrent neural network can use its internal memory to process sequences of inputs. In one embodiment, the recurrent neural network is a long short-term memory network. The long short-term memory network receives, as input, transaction description strings. The long short-term memory network outputs time and location data extracted from the transaction description strings. The long short-term memory also indicates transaction strings that do not include time and/or location data.

In one embodiment, the data management system 102 includes a raw user table database 128. The raw user table database 128 includes, for the various users of the data management system 102, one or more raw user transaction tables 110. Accordingly, the raw user table database 128 stores raw user transaction table data 156 corresponding to the raw user transaction tables 110. As described above, each raw user transaction table 110 includes a set of transactions and data fields indicating time of day and location data able to be extracted from the transaction description strings by the description string extraction engine 126.

In one embodiment, many location and time of day data fields may be empty in the raw user transaction tables because the transaction description strings do not include time of day or location data. In one embodiment, empty data fields may have data indicating a lack of data regarding time of day or location.

In one embodiment, the data management system 102 utilizes the time-location enrichment model 130 to generate estimated time of day and location data for the empty data fields in the raw user transaction tables 110. The time-location-enrichment model 130 analyzes available time of day and location data from the raw user transaction tables 110 to generate estimated time of day and location data for transactions for which time of day and/or location data is absent in the raw user transaction tables 110.

In one embodiment, the time-location enrichment model 130 utilizes a time-location iterative algorithm to generate estimated time data 158 and estimated location data 160. In one embodiment, the time-location iterative algorithm generates estimated times by solving for first time-distance constraints. The algorithm then generates location estimates or refines the location estimates by adding in second time-distance constraints and solving an inverse optimization problem. The algorithm includes performing the steps iteratively until estimated times and locations are optimized.

In one embodiment, the time-location iterative algorithm first generates first time-distance constraints based on the known transaction times and the known or partially known locations. In some cases, the transaction description string indicates a business name that has multiple locations or a type of business for which multiple locations are possible. By identifying known transaction times, known locations, and possible locations, the algorithm generates estimated time ranges for each transaction for which a time is not known. In the first iteration, these estimated time ranges are likely to be broad.

In one embodiment, after the estimated time ranges have been initially generated for the various transactions, the time-location iterative algorithm then refines estimated locations for transactions based on second time-distance constraints. The initial estimated times introduce the second time-distance constraints on possible locations based, in part, on travel time. The possible locations are refined by selecting possible locations or distance ranges that best fit the inverse optimization problem, by which travel time is minimized while selecting possible locations. For example, for a given transaction the possible locations are limited by the time required to travel from a known location of the user, i.e. a known transaction location or a residence of the user, to the unknown location of one of the transactions.

In one embodiment, the time-location enrichment model 130 can generate distance radii based on the time estimates and possible forms of transportation. In one example, a time-based constraint could indicate a 2-mile radius for walking distances, a 30-mile radius for driving distances, or a 20 mile radius for public transportation distances based on an estimated time range. Possible locations for the transaction are refined based on these time and transportation-based distance radii.

In one embodiment, after the estimated locations have been refined in the first iteration, the algorithm moves to the second generation and refines the estimated time ranges. In particular, the refined location estimates change the time distance constraints. The estimated time ranges are then refined, typically becoming narrower based on the refined time distance constraints.

In one embodiment, after the estimated time ranges have been refined in the second iteration, the time-location iterative algorithm again refines estimated locations. The estimated locations are refined based on the time related constraints introduced based on the refined estimated time ranges by solving the inverse optimization problem again.

In one embodiment, the time-location iterative algorithm continues iterations of refining estimated times and refining estimated locations, until estimated times and locations have been optimized. In many cases, locations can be exactly identified. For example, if a transaction description string identifies a business name for which multiple business locations are available in the vicinity of the user, then time-location enrichment model can identify the exact business location that fits based on the time-location iterative algorithm.

In one embodiment, when the time-location enrichment model 130 has completed the time-location iterative algorithm, the time-location enrichment model 130 generates estimated time data 158 and estimated location data 160. The estimated time data 158 corresponds to the estimated times of day for the transactions for which the transaction description strings do not include times of day. The estimated location data corresponds to estimated locations for transactions for which the transaction description strings include either no location data or incomplete location data.

In one embodiment, the time-location enrichment model 130 generates the estimated time and location data by identifying partially labeled data points, i.e. data points that include a time of day and partial or complete location data. The time-location enrichment model 130 then generates estimated times and locations in a way that solves for time and location related constraints. For example, the constraints can include that a user must have enough time to move between locations. The constraints can also include locations and time ranges that fit patterns observed in other users of the data management system. The time-location enrichment model generates estimated times and locations in a way that minimizes a function that sums up total user travel time.

Those of skill in the art will recognize, in light of the present disclosure, that other algorithms can be used by time-location enrichment model 130 to generate estimated time and location data. All such other algorithms fall within the scope of the present disclosure.

In one embodiment, the data management system 102 includes an enriched user table database 132. The enriched user table database 132 includes enriched user transaction table data 162. The enriched user transaction table data 162 includes the enriched user transaction tables 114. In one embodiment, the data management system 102 generates the enriched user transaction table data 162 by populating the empty data fields from the raw user transaction table data 156 with the estimated time data 158 and the estimated location data 160 generated by the time-location enrichment model 130.

In one embodiment, the data management system 102 utilizes the profile generation model 134 to generate user profile data 164. The user profile data 164 includes a profile for each user of the data management system 102. The profile generation model 134 generates the profile for each user based, in part, on the enriched user transaction table data 162.

In one embodiment, the profile generation model 134 analyzes the enriched user transaction table data 114 for a user in order to generate a profile for the user. The profile generation model 134 identifies characteristics of the user based on patterns extracted from the enriched user transaction table 114.

In one embodiment, the profile generation model 134 can generate profiles indicating many characteristics of the user. For example, the profile generation model 134 can generate a profile indicating what time of day the user is at work, whether the user buys coffee and breakfast in the morning, what the user's lunch habits are, when and where the user shops for groceries or clothing, the type of entertainment the user engages at various times of day, e.g., whether the user stays up late and eats out, the form of transportation the user takes to get to work, the form of transportation that the user takes on weekends, the weekend shopping and travel habits of the user, when the user takes vacation days, how many shifts the user works, the daily routes that the user takes to get to and from work, the likely age of the user, whether the user is likely married, whether the user likely as children, whether the user is a homeowner, whether the user is a renter, whether the user has roommates, and many other kinds of characteristics of the user.

In one embodiment, the profile generation model 134 generates user profiles by assigning values to users in a series of nonexclusive buckets or categories. The score can be assigned to each user for each bucket or category. A higher score indicates how strongly the user fits the category or bucket. Categories can include whether the user is an early morning riser, whether the user is a night owl, the type of work that the user does, the type of food that the user eats, the type of transportation the user uses, the age group of the user, the type of work that the user does, and many other types of categories. The category scores can be normalized or otherwise standardized across all users.

In one embodiment, the profile generation module 134 includes the user with other users that have similar characteristics. The profile generation module can refine lesser-known aspects of the user profile based on the profiles of other users that are similar to the user.

In one embodiment, the data management system 102 utilizes the content personalization model 136 to provide personalized data management services for the user. After the data management system 102 has generated the profile for the user, the data management system 102 is able to provide personalized data management services to the user based on the characteristics of the user. The personalized data management services can include recommending products and services of the data management system 102 most likely to be relevant to the user based on the characteristics of the user, providing promotional offerings from third parties that are likely to be relevant to the user based on the characteristics of the user, providing assistance topic recommendations to the user based on the characteristics of the user.

In one embodiment, the content personalization model 136 generates personalized content data 166 including interface content personalized for the user based on the user profile. The user interface module 120 outputs the personalized content data 166 to the user with the interface content data 142. The personalized content data 166 can include graphics, text, audio, or video data presented to the user as the user utilizes the services of the data management system 102. The personalized content data 166 can include a recommendation that the user access a particular product or service provided by the data management system 102. The personalized content data 166 can include a promotional offering from a third-party selected based on the user profile. The personalized content data 166 can include a link or prompts to access an assistance document that can assist the user in answering questions that the user is likely to have regarding aspects of the data management system 102. The personalized content data 166 can include other types of personalized content and various other user experience features to create a customized and improved user experience, according to various embodiments.

In one embodiment, the time-location enrichment model 130 includes a machine learning model trained with a machine learning process to generate estimated time data 158 and estimated location data 160 enriched user transaction tables 114. The time-location enrichment model 130 can be trained with a supervised machine learning process. The supervised machine learning process can utilize labels generated from the transactions of users of the data management system 102 for which time and location data is known. The supervised machine learning process can train the time-location enrichment model 130 to generate estimated times and locations that accurately reproduce the times and locations included in the labels. In one example, during the supervised machine learning process, the time-location enrichment model 130 can be provided with a series of transaction description strings with a typical distribution of known and unknown times and locations. The machine learning process trains the machine learning model to fill-in the unknown times and locations a way that matches the labeled training set. In this way, the time-location enrichment model 130 can be trained to accurately generate estimated time data 158 and estimated location data 160 based on known and partially known times and locations.

In one embodiment, the time-location enrichment model 130 utilizes a Bayesian probabilistic graphical model to identify time ranges and locations for transactions. The probabilistic graphical model is a probabilistic model that generates a graph that expresses a conditional dependence structure between the times and locations of a group of transactions. The probabilistic graphical model receives, as input, raw transaction table data including transaction description strings that include time and/or location data, and transaction description strings that do not include time and location data. The probabilistic graphical model outputs a graph indicating probabilities for time ranges and types (i.e. what kind of purchase has been made, thus enabling inference of a suitable location) of transactions based on the location and time data included in the raw transaction table data. The time-location enrichment model utilizes the probabilistic graphical model to identify the probable times and locations for the transactions that do not include this data.

In one embodiment, the probabilistic graphical model can be trained with a training set that includes, as input data, a large number of transactions description strings for a number of historical users of the data management system 102. The training set includes transaction description strings that include time data and/or location data. The training set also includes transactions for which time and location are not included in the description, but that are labeled and known for the purpose of training. The labeled data can also include the types of transactions, i.e. what kind of purchase was made. The probabilistic graphical model is trained to infer the types, times, and/or locations of the transactions that did not include time and/or location data based on the transaction description strings that included time and/or location data.

In one embodiment, after the probabilistic graphical model has been trained, the raw user transaction table data 156 can be passed to the probabilistic graphical model. The probabilistic graphical model then infers probable time windows and locations for transactions that do not include time and location data, based on the transactions that do include time and location data. Those of skill in the art will recognize, in light of the present disclosure, that other types of machine learning models can be utilized without departing from the scope of the present disclosure.

In one embodiment, the time-location enrichment model 130 generates estimated time data 158 and estimated location data 160 for the transactions of the user, based at least in part on known times and locations of other users of the data management system 102. For example, the time-location enrichment model 130 can generate estimated time data 158 and estimated location data 160 based on known times and locations or based on patterns known from other users of the data management system that are known to be similar to the user based on the profile of the user. Accordingly, other users of the data management system will have similar behavioral patterns as the user these behavioral patterns of other users can be utilized to make more informed time and location estimates for transactions of the user.

In one embodiment, the profile generation model 134 includes a machine learning model. The machine learning model can include an unsupervised clustering model, such as a density-based spatial clustering of applications with noise (DBSCAN) machine learning model. The DBSCAN model receives, characteristics data for a large number of users. The DBSCAN model clusters the users based on their characteristics. The user characteristics data can include one or both of the raw transaction table data and the enriched transaction table data for a large number of users. The DBSCAN model then identifies groupings of the users based on the times and locations of their transactions. The user characteristics data can also include demographics data associated with the users, such as age, geolocation, gender, marital status, employment data, home ownership data, and other demographics data. The DBSCAN model clusters the users based on the user characteristics data. Each cluster of users corresponds to a group of users. The profile generation model 134 then profiles the user based on the cluster to which the user belongs. In one embodiment, profile generation model 134 can identify patterns in the characteristics of a user and to fill in unknown aspects of the user characteristics based on the known characteristics of the user. Those of skill in the art will recognize, in light of the present disclosure, that clustering models other than a DBSCAN model can be used without departing from the scope of the present disclosure.

In one embodiment, the data management system 102 utilizes feedback between the time-location enrichment model 130 and the profile generation model 134. The time-location enrichment model 130 initially generates estimated time data 158 and estimated location data 160 for the user based on the known aspects of the transactions of the user and the time and location constraints. The profile generation model 134 then generates a profile for the user and identifies other users that are similar to the user based on the profile. This data is then fed back to the time-location enrichment model 130. The time-location enrichment model 130 utilizes the known patterns of user similar to the user based on the user profile data 164 to assist in generating the estimated time data 158 and the estimated location data 160. The estimated time data 158 and estimated location data 160 are then utilized to improve the user profile by the profile generation model 134. In this way, the data management system 102 utilizes feedback between the time-location enrichment model 130 in the profile generation model 134 in order to enhance both the enriched user transaction table 114 and the user profile.

Embodiments of the present disclosure address some of the shortcomings associated with traditional data management systems. Time-location algorithms are used to estimate additional unknown data related to the transactions. The various embodiments of the disclosure can be implemented to improve the technical fields of data management, data processing, and data transmission. Therefore, the various described embodiments of the disclosure and their associated benefits amount to significantly more than an abstract idea.

Figure 5:
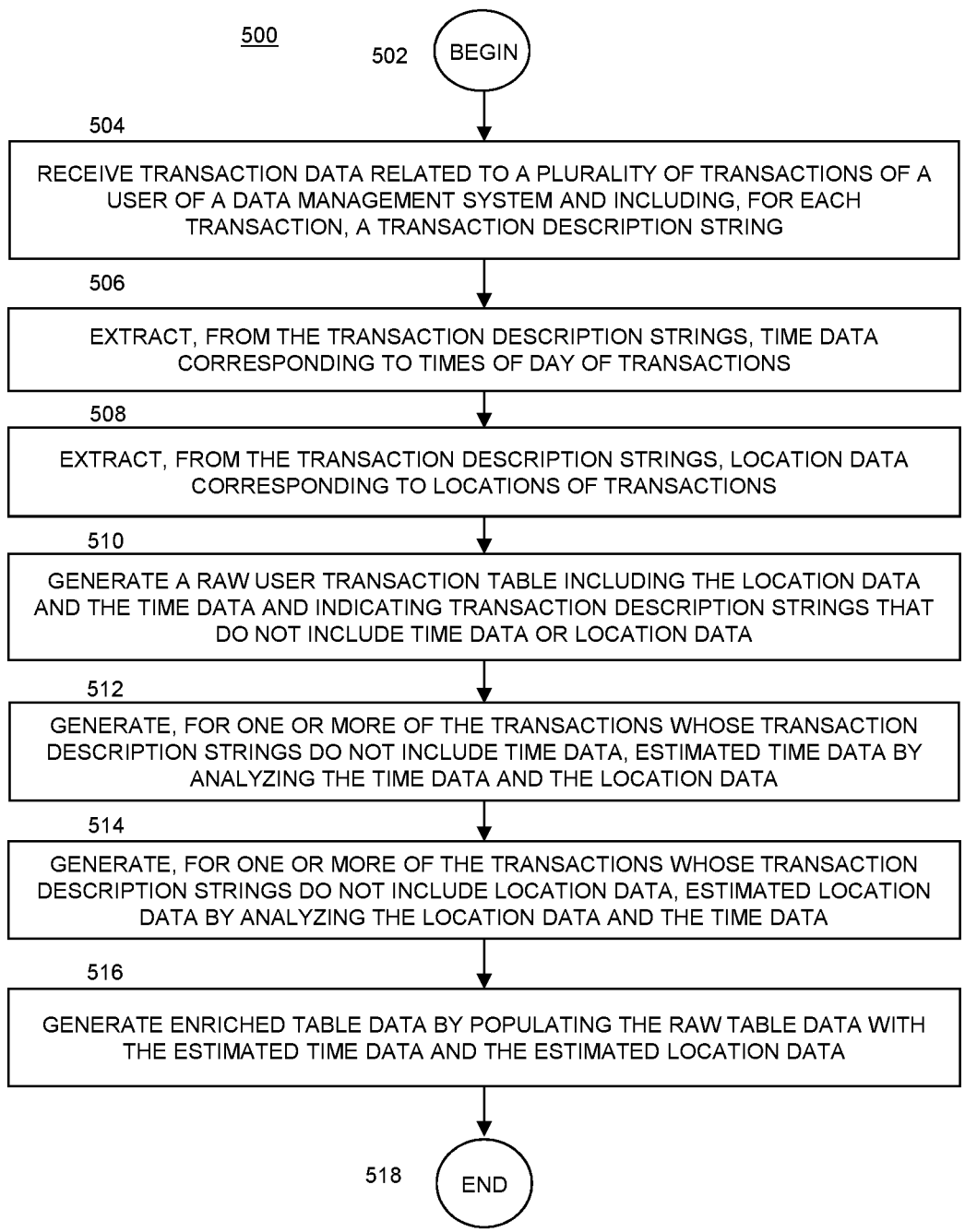
FIG. 5 is a flow diagram of a process for predicting characteristics of transactions of users of a data management system, in accordance with one embodiment.

FIG. 5 illustrates a flow diagram of a process 500 for predicting characteristics of transactions of users of a data management system, according to various embodiments.

Referring to FIG. 5 and the description of FIGS. 1-4 above, in one embodiment, process 500 begins at BEGIN 502 and process flow proceeds to RECEIVE TRANSACTION DATA RELATED TO A PLURALITY OF TRANSACTIONS OF A USER OF A DATA MANAGEMENT SYSTEM AND INCLUDING, FOR EACH TRANSACTION, A TRANSACTION DESCRIPTION STRING 504.

In one embodiment, at RECEIVE TRANSACTION DATA RELATED TO A PLURALITY OF TRANSACTIONS OF A USER OF A DATA MANAGEMENT SYSTEM AND INCLUDING, FOR EACH TRANSACTION, A TRANSACTION DESCRIPTION STRING 504, transaction data is received related to a plurality of transactions of a user of a data management system and including, for each transaction, a transaction description string, using any of the methods, processes, and procedures discussed above with respect to FIGS. 1-4.

In one embodiment, once transaction data is received related to a plurality of transactions of a user of a data management system and including, for each transaction, a transaction description string at RECEIVE TRANSACTION DATA RELATED TO A PLURALITY OF TRANSACTIONS OF A USER OF A DATA MANAGEMENT SYSTEM AND INCLUDING, FOR EACH TRANSACTION, A TRANSACTION DESCRIPTION STRING 504 process flow proceeds to EXTRACT, FROM THE TRANSACTION DESCRIPTION STRINGS, TIME DATA CORRESPONDING TO TIMES OF DAY OF TRANSACTIONS 506.

In one embodiment, at EXTRACT, FROM THE TRANSACTION DESCRIPTION STRINGS, TIME DATA CORRESPONDING TO TIMES OF DAY OF TRANSACTIONS 506, time data is extracted, from the transaction description strings, corresponding to times of day of transactions, using any of the methods, processes, and procedures discussed above with respect to FIGS. 1-4.

In one embodiment, once time data is extracted, from the transaction description strings, corresponding to times of day of transactions at EXTRACT, FROM THE TRANSACTION DESCRIPTION STRINGS, TIME DATA CORRESPONDING TO TIMES OF DAY OF TRANSACTIONS 506, process flow proceeds to EXTRACT, FROM THE TRANSACTION DESCRIPTION STRINGS, LOCATION DATA CORRESPONDING TO LOCATIONS OF TRANSACTIONS 508.

In one embodiment, at EXTRACT, FROM THE TRANSACTION DESCRIPTION STRINGS, LOCATION DATA CORRESPONDING TO LOCATIONS OF TRANSACTIONS 508, location data is extracted, from the transaction description strings, corresponding to locations of transactions, using any of the methods, processes, and procedures discussed above with respect to FIGS. 1-4.

In one embodiment, once location data is extracted, from the transaction description strings, corresponding to locations of transactions, a transaction description string at EXTRACT, FROM THE TRANSACTION DESCRIPTION STRINGS, LOCATION DATA CORRESPONDING TO LOCATIONS OF TRANSACTIONS 508, process flow proceeds to GENERATE A RAW USER TRANSACTION TABLE INCLUDING THE LOCATION DATA AND THE TIME DATA AND INDICATING TRANSACTION DESCRIPTION STRINGS THAT DO NOT INCLUDE TIME DATA OR LOCATION DATA 510.

In one embodiment, at GENERATE A RAW USER TRANSACTION TABLE INCLUDING THE LOCATION DATA AND THE TIME DATA AND INDICATING TRANSACTION DESCRIPTION STRINGS THAT DO NOT INCLUDE TIME DATA OR LOCATION DATA 510, a raw user transaction table is generated including the location data and the time data and indicating transaction description strings that do not include time data or location data, using any of the methods, processes, and procedures discussed above with respect to FIGS. 1-4.

In one embodiment, once a raw user transaction table is generated including the location data and the time data and indicating transaction description strings that do not include time data or location data at GENERATE A RAW USER TRANSACTION TABLE INCLUDING THE LOCATION DATA AND THE TIME DATA AND INDICATING TRANSACTION DESCRIPTION STRINGS THAT DO NOT INCLUDE TIME DATA OR LOCATION DATA 510, process flow proceeds to GENERATE, FOR ONE OR MORE OF THE TRANSACTIONS WHOSE TRANSACTION DESCRIPTION STRINGS DO NOT INCLUDE TIME DATA, ESTIMATED TIME DATA BY ANALYZING THE TIME DATA AND THE LOCATION DATA 512.

In one embodiment, at GENERATE, FOR ONE OR MORE OF THE TRANSACTIONS WHOSE TRANSACTION DESCRIPTION STRINGS DO NOT INCLUDE TIME DATA, ESTIMATED TIME DATA BY ANALYZING THE TIME DATA AND THE LOCATION DATA 512, estimated time data is generated, for one or more of the transactions whose transaction description strings do not include time data, by analyzing the time data and the location data, using any of the methods, processes, and procedures discussed above with respect to FIGS. 1-4.

In one embodiment, once estimated time data is generated, for one or more of the transactions whose transaction description strings do not include time data, by analyzing the time data and the location data at GENERATE, FOR ONE OR MORE OF THE TRANSACTIONS WHOSE TRANSACTION DESCRIPTION STRINGS DO NOT INCLUDE TIME DATA, ESTIMATED TIME DATA BY ANALYZING THE TIME DATA AND THE LOCATION DATA 512, process flow proceeds GENERATE, FOR ONE OR MORE OF THE TRANSACTIONS WHOSE TRANSACTION DESCRIPTION STRINGS DO NOT INCLUDE LOCATION DATA, ESTIMATED LOCATION DATA BY ANALYZING THE LOCATION DATA AND THE TIME DATA 514.

In one embodiment, at GENERATE, FOR ONE OR MORE OF THE TRANSACTIONS WHOSE TRANSACTION DESCRIPTION STRINGS DO NOT INCLUDE LOCATION DATA, ESTIMATED LOCATION DATA BY ANALYZING THE LOCATION DATA AND THE TIME DATA 514, estimated location data is generated, for one or more of the transactions whose transaction description strings do not include location data, by analyzing the location data and the time data, using any of the methods, processes, and procedures discussed above with respect to FIGS. 1-4.

In one embodiment, once estimated location data is generated, for one or more of the transactions whose transaction description strings do not include location data, by analyzing the location data and the time data, at GENERATE, FOR ONE OR MORE OF THE TRANSACTIONS WHOSE TRANSACTION DESCRIPTION STRINGS DO NOT INCLUDE LOCATION DATA, ESTIMATED LOCATION DATA BY ANALYZING THE LOCATION DATA AND THE TIME DATA 514, process flow proceeds GENERATE ENRICHED TABLE DATA BY POPULATING THE RAW TABLE DATA WITH THE ESTIMATED TIME DATA AND THE ESTIMATED LOCATION DATA 516.

In one embodiment, at GENERATE ENRICHED TABLE DATA BY POPULATING THE RAW TABLE DATA WITH THE ESTIMATED TIME DATA AND THE ESTIMATED LOCATION DATA 516, enriched table data is generated by populating the raw table data with the estimated time data and the estimated location data, using any of the methods, processes, and procedures discussed above with respect to FIGS. 1-4.

In one embodiment, once enriched table data is generated by populating the raw table data with the estimated time data and the estimated location data at GENERATE ENRICHED TABLE DATA BY POPULATING THE RAW TABLE DATA WITH THE ESTIMATED TIME DATA AND THE ESTIMATED LOCATION DATA 516, process flow proceeds to END 518.

In one embodiment, at END 518 the process for predicting characteristics of transactions of users of a data management system is exited to await new data and/or instructions.

Figure 6:
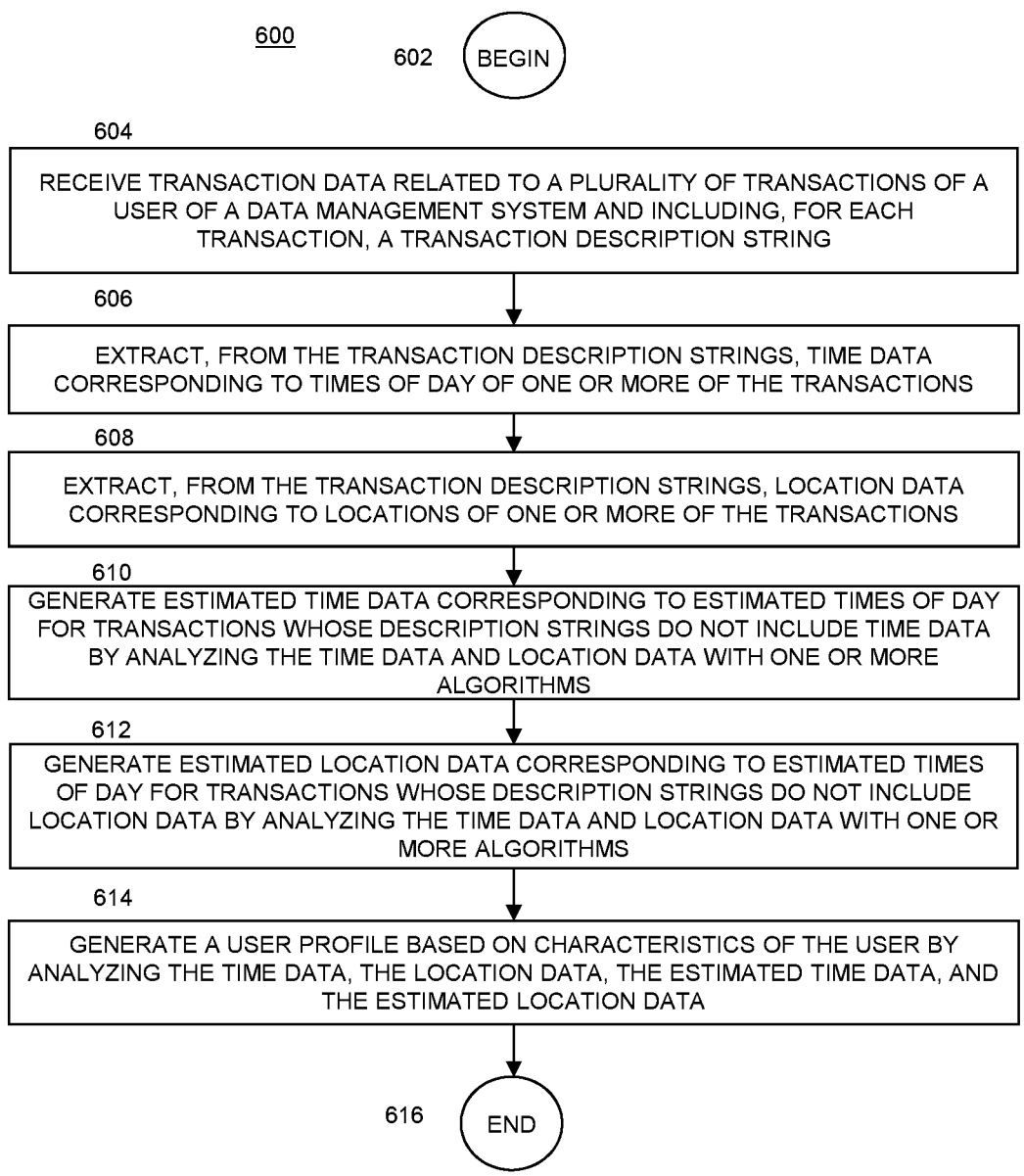
FIG. 6 is a flow diagram of a process for predicting characteristics of transactions of users of a data management system, in accordance with one embodiment.

FIG. 6 illustrates a flow diagram of a process 600 for predicting characteristics of transactions of users of a data management system, according to various embodiments.

Referring to FIG. 6, and the description of FIGS. 1-4 above, in one embodiment, process 600 begins at BEGIN 602 and process flow proceeds to RECEIVE TRANSACTION DATA RELATED TO A PLURALITY OF TRANSACTIONS OF A USER OF A DATA MANAGEMENT SYSTEM AND INCLUDING, FOR EACH TRANSACTION, A TRANSACTION DESCRIPTION STRING 604.

In one embodiment, at RECEIVE TRANSACTION DATA RELATED TO A PLURALITY OF TRANSACTIONS OF A USER OF A DATA MANAGEMENT SYSTEM AND INCLUDING, FOR EACH TRANSACTION, A TRANSACTION DESCRIPTION STRING 604, transaction data is received related to a plurality of transactions of a user of a data management system and including, for each transaction, a transaction description string, using any of the methods, processes, and procedures discussed above with respect to FIGS. 1-4.

In one embodiment, once transaction data is received related to a plurality of transactions of a user of a data management system and including, for each transaction, a transaction description string at RECEIVE TRANSACTION DATA RELATED TO A PLURALITY OF TRANSACTIONS OF A USER OF A DATA MANAGEMENT SYSTEM AND INCLUDING, FOR EACH TRANSACTION, A TRANSACTION DESCRIPTION STRING 604 process flow proceeds to EXTRACT, FROM THE TRANSACTION DESCRIPTION STRINGS, TIME DATA CORRESPONDING TO TIMES OF DAY OF ONE OR MORE OF THE TRANSACTIONS 606.

In one embodiment, at EXTRACT, FROM THE TRANSACTION DESCRIPTION STRINGS, TIME DATA CORRESPONDING TO TIMES OF DAY OF ONE OR MORE OF THE TRANSACTIONS 606, time data is extracted, from the transaction description strings, corresponding to times of day of one or more of the transactions, using any of the methods, processes, and procedures discussed above with respect to FIGS. 1-4.

In one embodiment, once time data is extracted, from the transaction description strings, corresponding to times of day of one or more of the transactions at EXTRACT, FROM THE TRANSACTION DESCRIPTION STRINGS, TIME DATA CORRESPONDING TO TIMES OF DAY OF ONE OR MORE OF THE TRANSACTIONS 606, process flow proceeds to EXTRACT, FROM THE TRANSACTION DESCRIPTION STRINGS, LOCATION DATA CORRESPONDING TO LOCATIONS OF ONE OR MORE OF THE TRANSACTIONS 608.

In one embodiment, at EXTRACT, FROM THE TRANSACTION DESCRIPTION STRINGS, LOCATION DATA CORRESPONDING TO LOCATIONS OF ONE OR MORE OF THE TRANSACTIONS 608, location data is extracted, from the transaction description strings, corresponding to locations of one or more of the transactions, using any of the methods, processes, and procedures discussed above with respect to FIGS. 1-4.

In one embodiment, once location data is extracted, from the transaction description strings, corresponding to locations of one or more of the transactions at EXTRACT, FROM THE TRANSACTION DESCRIPTION STRINGS, LOCATION DATA CORRESPONDING TO LOCATIONS OF ONE OR MORE OF THE TRANSACTIONS 608, process flow proceeds to GENERATE ESTIMATED TIME DATA CORRESPONDING TO ESTIMATED TIMES OF DAY FOR TRANSACTIONS WHOSE DESCRIPTION STRINGS DO NOT INCLUDE TIME DATA BY ANALYZING THE TIME DATA AND LOCATION DATA WITH ONE OR MORE ALGORITHMS 610.

In one embodiment, at GENERATE ESTIMATED TIME DATA CORRESPONDING TO ESTIMATED TIMES OF DAY FOR TRANSACTIONS WHOSE DESCRIPTION STRINGS DO NOT INCLUDE TIME DATA BY ANALYZING THE TIME DATA AND LOCATION DATA WITH ONE OR MORE ALGORITHMS 610, estimated time data is generated corresponding to estimated times of day for transactions whose description strings do not include time data by analyzing the time data and location data with one or more algorithms, using any of the methods, processes, and procedures discussed above with respect to FIGS. 1-4.

In one embodiment, once estimated time data is generated corresponding to estimated times of day for transactions whose description strings do not include time data by analyzing the time data and location data with one or more algorithms at GENERATE ESTIMATED TIME DATA CORRESPONDING TO ESTIMATED TIMES OF DAY FOR TRANSACTIONS WHOSE DESCRIPTION STRINGS DO NOT INCLUDE TIME DATA BY ANALYZING THE TIME DATA AND LOCATION DATA WITH ONE OR MORE ALGORITHMS 610, process flow proceeds to GENERATE ESTIMATED LOCATION DATA CORRESPONDING TO ESTIMATED TIMES OF DAY FOR TRANSACTIONS WHOSE DESCRIPTION STRINGS DO NOT INCLUDE LOCATION DATA BY ANALYZING THE TIME DATA AND LOCATION DATA WITH ONE OR MORE ALGORITHMS 612.

In one embodiment, at GENERATE ESTIMATED LOCATION DATA CORRESPONDING TO ESTIMATED TIMES OF DAY FOR TRANSACTIONS WHOSE DESCRIPTION STRINGS DO NOT INCLUDE LOCATION DATA BY ANALYZING THE TIME DATA AND LOCATION DATA WITH ONE OR MORE ALGORITHMS 612, estimated location data is generated corresponding to estimated times of day for transactions whose description strings do not include location data by analyzing the time data and location data with one or more algorithms, using any of the methods, processes, and procedures discussed above with respect to FIGS. 1-4.

In one embodiment, once estimated location data is generated corresponding to estimated times of day for transactions whose description strings do not include location data by analyzing the time data and location data with one or more algorithms at GENERATE ESTIMATED LOCATION DATA CORRESPONDING TO ESTIMATED TIMES OF DAY FOR TRANSACTIONS WHOSE DESCRIPTION STRINGS DO NOT INCLUDE LOCATION DATA BY ANALYZING THE TIME DATA AND LOCATION DATA WITH ONE OR MORE ALGORITHMS 612, process flow proceeds to GENERATE A USER PROFILE BASED ON CHARACTERISTICS OF THE USER BY ANALYZING THE TIME DATA, THE LOCATION DATA, THE ESTIMATED TIME DATA, AND THE ESTIMATED LOCATION DATA 614.

In one embodiment, at GENERATE A USER PROFILE BASED ON CHARACTERISTICS OF THE USER BY ANALYZING THE TIME DATA, THE LOCATION DATA, THE ESTIMATED TIME DATA, AND THE ESTIMATED LOCATION DATA 614, a user profile is generated based on characteristics of the user by analyzing the time data, the location data, the estimated time data, and the estimated location data, using any of the methods, processes, and procedures discussed above with respect to FIGS. 1-4.

In one embodiment, once a user profile is generated based on characteristics of the user by analyzing the time data, the location data, the estimated time data, and the estimated location data at GENERATE A USER PROFILE BASED ON CHARACTERISTICS OF THE USER BY ANALYZING THE TIME DATA, THE LOCATION DATA, THE ESTIMATED TIME DATA, AND THE ESTIMATED LOCATION DATA 614, process flow proceeds to END 616.

In one embodiment, at END 616 the process for predicting characteristics of transactions of users of a data management system is exited to await new data and/or instructions.

As noted above, the specific illustrative examples discussed above are but illustrative examples of implementations of embodiments of the method or process for predicting characteristics of transactions of users of a data management system. Those of skill in the art will readily recognize that other implementations and embodiments are possible. Therefore, the discussion above should not be construed as a limitation on the claims provided below.

In one embodiment, a computing system implemented method identifies characteristics of transaction description strings. The method includes receiving transaction data related to a plurality of transactions of a user of a data management system and including, for each transaction, a transaction description string. The method includes extracting, from the transaction description strings, time data corresponding to times of day of transactions and extracting, from the transaction description strings, location data corresponding to locations of transactions. The method includes generating a raw user transaction table data including the location data and the time data and indicating transaction description strings that do not include time data or location data and generating, for one or more of the transactions whose transaction description strings do not include time data, estimated time data by analyzing the time data and the location data. The method includes generating, for one or more of the transactions whose transaction description strings do not include location data, estimated location data by analyzing the location data and the time data and generating enriched table data by populating the raw table data with the estimated time data and the estimated location data.

In one embodiment, a system for predicting characteristics of transactions of users of a data management system, the system includes at least one processor at least one memory coupled to the at least one processor. The at least one memory has stored therein instructions which, when executed by any set of the one or more processors, perform a process. The process includes receiving transaction data related to a plurality of transactions of a user of a data management system and including, for each transaction, a transaction description string. The process includes extracting, from the transaction description strings, time data corresponding to times of day of transactions and extracting, from the transaction description strings, location data corresponding to locations of transactions. The process includes generating a raw user transaction table data including the location data and the time data and indicating transaction description strings that do not include time data or location data and generating, for one or more of the transactions whose transaction description strings do not include time data, estimated time data by analyzing the time data and the location data. The process includes generating, for one or more of the transactions whose transaction description strings do not include location data, estimated location data by analyzing the location data and the time data and generating enriched table data by populating the raw table data with the estimated time data and the estimated location data.

In one embodiment, a computing system implemented method identifies characteristics of transaction description strings. The method includes receiving transaction data related to a plurality of transactions of a user of a data management system and including, for each transaction, a transaction description string and extracting, from the transaction description strings, time data corresponding to times of day of one or more of the transactions. The method includes extracting, from the transaction description strings, location data corresponding to locations of one or more of the transactions and generating estimated time data corresponding to estimated times of day for transactions whose description strings do not include time data by analyzing the time data and location data with one or more algorithms. The method includes generating estimated location data corresponding to estimated times of day for transactions whose description strings do not include location data by analyzing the time data and location data with one or more algorithms. The method includes generating a user profile based on characteristics of the user by analyzing the time data, the location data, the estimated time data, and the estimated location data.

In one embodiment, a system predicts characteristics of transactions of users of a data management system. The system includes at least one processor at least one memory coupled to the at least one processor. The at least one memory has stored therein instructions which, when executed by any set of the one or more processors, perform a process. The process includes receiving transaction data related to a plurality of transactions of a user of a data management system and including, for each transaction, a transaction description string and extracting, from the transaction description strings, time data corresponding to times of day of one or more of the transactions. The process includes extracting, from the transaction description strings, location data corresponding to locations of one or more of the transactions and generating estimated time data corresponding to estimated times of day for transactions whose description strings do not include time data by analyzing the time data and location data with one or more algorithms. The process includes generating estimated location data corresponding to estimated times of day for transactions whose description strings do not include location data by analyzing the time data and location data with one or more algorithms. The process includes generating a user profile based on characteristics of the user by analyzing the time data, the location data, the estimated time data, and the estimated location data.

In one embodiment, a computing system implemented method identifies characteristics of transaction description strings. The method includes receiving transaction data related to a plurality of transactions of a user of a data management system and including, for each transaction, a transaction description string. The method includes generating estimated time data corresponding to estimated times of day for transactions whose transaction description strings do not include time data by analyzing, with one or more algorithms, time data and location data from transaction description strings that include time data and location data. The method includes generating estimated location data corresponding to estimated times of day for transactions whose transaction description strings do not include location data by analyzing, with one or more algorithms, time data and location data from transaction description strings that include time data and location data.

In one embodiment, a system predicts characteristics of transactions of users of a data management system. The system includes at least one processor at least one memory coupled to the at least one processor. The at least one memory has stored therein instructions which, when executed by any set of the one or more processors, perform a process. The process includes receiving transaction data related to a plurality of transactions of a user of a data management system and including, for each transaction, a transaction description string. The process includes generating estimated time data corresponding to estimated times of day for transactions whose transaction description strings do not include time data by analyzing, with one or more algorithms, time data and location data from transaction description strings that include time data and location data. The process includes generating estimated location data corresponding to estimated times of day for transactions whose transaction description strings do not include location data by analyzing, with one or more algorithms, time data and location data from transaction description strings that include time data and location data.

The disclosed embodiments provide one or more technical solutions to the technical problem of transaction description strings that do not include information relevant to understand the user. These and other embodiments of the data management system are discussed in further detail below.

Utilizing a time-location enrichment model to better understand transaction description strings is a technical solution to a long-standing technical problem and is not an abstract idea for at least a few reasons. First, utilizing a time-location enrichment model to better understand transaction description strings is not an abstract idea because it is not merely an idea itself (e.g., can be performed mentally or using pen and paper). Second, utilizing a time-location enrichment model to better understand transaction description strings is not an abstract idea because it is not a fundamental economic practice (e.g., is not merely creating a contractual relationship, hedging, mitigating a settlement risk, etc.). Third, utilizing a time-location enrichment model to better understand transaction description strings is not an abstract idea because it is not a method of organizing human activity (e.g., managing a game of bingo). Fourth, although mathematics may be used to generate an analytics model, the disclosed and claimed methods and systems of utilizing a time-location enrichment model to better understand transaction description strings are not an abstract idea because the methods and systems are not simply a mathematical relationship/formula.

Utilizing a time-location enrichment model to better understand transaction description strings is not an abstract idea because utilizing machine learning processes to better understand transaction description strings yields significant improvement to the technical fields of electronic data management, data processing, user experience, customer service, and customer retention, according to one embodiment. The present disclosure adds significantly to the field of electronic data management because the disclosed data management system increases the knowledge of the needs and purposes of users of the data management system, increases the ability of the data management system to provide automated assistance in sorting, grouping and categorizing transactions, increases the likelihood of improving/maintaining a user's trust in the data management system; and reduces the amount of time users spend managing their finances, according to one embodiment.

As a result, embodiments of the present disclosure allow for reduced use of processor cycles, memory, and power consumption, by improving the personalization of the data management system. Consequently, computing and communication systems implementing or providing the embodiments of the present disclosure are transformed into more operationally efficient devices and systems. In addition to improving overall computing performance, utilizing a time-location enrichment model to better understand transaction description strings significantly improves the field of data management systems by more efficiently providing personalized content to users, according to one embodiment. Therefore, both human and non-human resources are utilized more efficiently. Furthermore, by utilizing a time-location enrichment model to better understand transaction description strings, loyalty in the data management system is increased. This results in repeat customers, efficient data management services, and reduced abandonment of use of the data management system, according to one embodiment.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for predicting characteristics of transactions of users of a data management system, the method comprising:
   receiving data related to a plurality of transactions of a user of the data management system, the data including a transaction description string for each transaction;
   extracting, from the transaction description strings, time data corresponding to times of day of a first set of one or more of the transactions;

extracting, from the transaction description strings, location data corresponding to locations of a second set of one or more of the transactions;

generating estimated time data corresponding to estimated times of day for a third set of transactions including transaction description strings that do not include time data, wherein the estimated time data is generated based at least in part on analysis of the time data and the location data extracted from the transaction description strings for the first set of one or more of the transactions and the second set of one or more of the transactions according to one or more algorithms; and generating estimated location data corresponding to the estimated times of day for the third set of transactions including transaction description strings that do not include location data wherein the estimated location data is generated based at least in part on analysis of the time data and the location data extracted from the transaction description strings for the first set of one or more of the transactions and the second set of one or more of the transactions according to the one or more algorithms.

2. The method of claim 1, further comprising generating a raw user transaction table including the time data, including the location data, and indicating transactions that do not include time data or location data.

3. The method of claim 2, further comprising generating an enriched user transaction table based on population of the raw user transaction table with the estimated time data and the estimated location data.

4. The method of claim 1, further comprising generating a user profile identifying characteristics of the user based on analysis of the time data, the location data, the estimated time data, and the estimated location data.

5. The method of claim 4, further comprising generating user profiles for other users of the data management system based on characteristics of the respective other users.

6. The method of claim 5, further comprising generating the estimated time data and the estimated location data based on analysis of transactions of the other users.

7. The method of claim 5, further comprising grouping the user with one or more of the other users based on the user profile of the user and the user profiles of the other users.

8. The method of claim 7, further comprising generating the estimated time data and the estimated location data based on analysis of transactions of other users with whom the user is grouped.

9. The method of claim 5, further comprising generating personalized content data for the user based on the user profile.

10. The method of claim 1, wherein the one or more algorithms include a time-location iterative algorithm.

11. The method of claim 10, wherein the time-location iterative algorithm includes:
identifying first time-distance constraints based on the time data and the location data;
generating the estimated time data based on the first time-distance constraints;
identifying second time-distance constraints based on the estimated time data; and
generating the estimated location data based on the second time-distance constraints.

12. The method of claim 11, wherein the time-location iterative algorithm includes:
iteratively refining the estimated time data based on the estimated location data; and
iteratively refining the estimated location data based on the estimated time data.

13. The method of claim 1, wherein the estimated time data includes time ranges.

14. The method of claim 1, wherein the estimated location data includes latitude and longitude coordinates.

15. A system for predicting characteristics of transactions of users of a data management system, the system comprising:
at least one processor; and
at least one memory coupled to the at least one processor, the at least one memory storing instructions which, when executed by the at least one processor, perform operations including:
receiving data related to a plurality of transactions of a user of the data management system, the data including a transaction description string for each transaction;
extracting, from the transaction description strings, time data corresponding to times of day of a first set of one or more of the transactions;
extracting, from the transaction description strings, location data corresponding to locations of a second set of one or more of the transactions;
generating estimated time data corresponding to estimated times of day for a third set of transactions including transaction description strings that do not include time data wherein the estimated time data is generated based at least in part on analysis of the time data and the location data extracted from the transaction description strings for the first set of one or more of the transactions and the second set of one or more of the transactions according to one or more algorithms;
generating estimated location data corresponding to the estimated times of day for the third set of transactions including transaction description strings that do not include location data, wherein the estimated location data is generated based at least in part on analysis of the time data and the location data extracted from the transaction description strings for the first set of one or more of the transactions and the second set of one or more of the transactions according to the one or more algorithms; and
generating a user profile based on characteristics of the user based on analysis of the time data, the location data, the estimated time data, and the estimated location data.

16. The system of claim 15, wherein the at least one processor performs operations further including generating the estimated time data and the estimated location data using a time-location enrichment model.

17. The system of claim 16, wherein the at least one processor performs operations further including training the time-location enrichment model with one or more machine learning processes, the trained time-location enrichment model configured to generate the estimated time data and the estimated location data.

18. The system of claim 17, wherein the time-location enrichment model is configured to generate the estimated time data and the estimated location data based on execution of a time-location iterative algorithm.

19. The system of claim 18, wherein the time-location iterative algorithm includes:
identifying first time-distance constraints based on the time data and the location data;

generating the estimated time data based on the first time-distance constraints;
identifying second time-distance constraints based on the estimated time data; and
generating the estimated location data based on the second time-distance constraints.

20. The system of claim 19, wherein the time-location iterative algorithm includes:
iteratively refining the estimated time data based on the estimated location data; and
iteratively refining the estimated location data based on the estimated time data.

21. The system of claim 15, wherein extracting the time data and the location data includes analyzing the transaction description strings using a regular expressions extraction process.

22. A method for predicting characteristics of transactions of users of a data management system, the method comprising:
receiving data related to a plurality of transactions of a user of the data management system, the data including a transaction description string for each transaction;
generating estimated time data corresponding to estimated times of day for a first set of transactions including transaction description strings that do not include time data, wherein the estimated time data is generated based at least in part on analysis of time data and location data associated with a second set of transactions including transaction description strings that include time data and location data using one or more algorithms; and
generating estimated location data corresponding to the estimated times of day for the first set of transactions including transaction description strings that do not include location data, wherein the estimated location data is generated based at least in part on analysis of time data and location data associated with the second set of transactions including transaction description strings that include time data and location data using the one or more algorithms.

23. The method of claim 22, further comprising:
generating the time data based on extraction of time data from the transaction description strings that include times of day, corresponding to times of day of the second set of the transactions; and
generating the location data based on extraction of location data from the transaction description strings that include locations, corresponding to the locations of the second set of transactions.

* * * * *